(12) United States Patent
Yamazaki

(10) Patent No.: US 8,208,028 B2
(45) Date of Patent: Jun. 26, 2012

(54) OBJECT VERIFICATION DEVICE AND OBJECT VERIFICATION METHOD

(75) Inventor: Ryuji Yamazaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 738 days.

(21) Appl. No.: 12/299,939

(22) PCT Filed: Aug. 7, 2007

(86) PCT No.: PCT/JP2007/065392
§ 371 (c)(1),
(2), (4) Date: Nov. 7, 2008

(87) PCT Pub. No.: WO2008/018423
PCT Pub. Date: Feb. 14, 2008

(65) Prior Publication Data
US 2009/0189984 A1  Jul. 30, 2009

(30) Foreign Application Priority Data

Aug. 7, 2006 (JP) .................................. 2006-214111

(51) Int. Cl.
*H04N 5/225* (2006.01)
(52) U.S. Cl. .......................... 348/169; 382/118; 348/143
(58) Field of Classification Search .................. 348/143, 348/152, 155, 156, 169; 382/118
See application file for complete search history.

(56) References Cited

U.S. PATENT DOCUMENTS

| 6,411,209 B1 * | 6/2002 | Lyons et al. ................... 340/541 |
| 6,567,116 B1 * | 5/2003 | Aman et al. ................... 348/169 |
| 7,158,657 B2 * | 1/2007 | Okazaki et al. ............... 382/118 |
| 7,613,325 B2 | 11/2009 | Iwasaki |
| 2002/0034319 A1 * | 3/2002 | Tumey et al. ................. 382/116 |
| 2004/0073660 A1 * | 4/2004 | Toomey ........................ 709/224 |
| 2004/0081338 A1 * | 4/2004 | Takenaka ..................... 382/118 |
| 2006/0115116 A1 | 6/2006 | Iwasaki |
| 2006/0115235 A1 * | 6/2006 | Takikawa et al. ............... 386/68 |
| 2006/0126737 A1 * | 6/2006 | Boice et al. ............... 375/240.16 |
| 2006/0203090 A1 * | 9/2006 | Wang et al. ................... 348/143 |
| 2006/0288234 A1 * | 12/2006 | Azar et al. .................... 713/186 |
| 2008/0130948 A1 * | 6/2008 | Ozer ............................. 382/103 |
| 2009/0060293 A1 * | 3/2009 | Nagao et al. ................. 382/118 |
| 2010/0111377 A1 * | 5/2010 | Monroe ........................ 382/118 |

FOREIGN PATENT DOCUMENTS

| JP | 08-205131 A | 8/1996 |
| JP | 11175730 A | 7/1999 |
| JP | 2002-236913 A | 8/2002 |
| JP | 2003-087771 A | 3/2003 |

(Continued)

*Primary Examiner* — Emmanuel L Moise
*Assistant Examiner* — Sarah Drabik
(74) *Attorney, Agent, or Firm* — RatnerPrestia

(57) ABSTRACT

An apparatus for verifying subjects includes: a camera for photographing a plurality of subjects; a subject detector for detecting subject images of each of the subjects from the pieces of image information photographed by the camera; a subject tracking unit for tracking each of the subjects based on the movement of the subject images corresponding to each of the subjects and for forming tracking information of each of the subjects; a tracking information storage for storing the tracking information of each of the subjects; a subject selector for selecting a subject to be verified from the plurality of subjects based on the tracking information; a verification unit for verifying the selected subject; and a notification unit for notifying the verified result.

18 Claims, 12 Drawing Sheets

FOREIGN PATENT DOCUMENTS

| | | |
|---|---|---|
| JP | 2004-185484 A | 7/2004 |
| JP | 2004-272933 A | 9/2004 |
| JP | 2004272933 A | 9/2004 |
| JP | 2005210369 A | 8/2005 |
| WO | WO-2005020152 A1 | 3/2005 |
| WO | PCT/JP2007/065392 | 9/2007 |

* cited by examiner

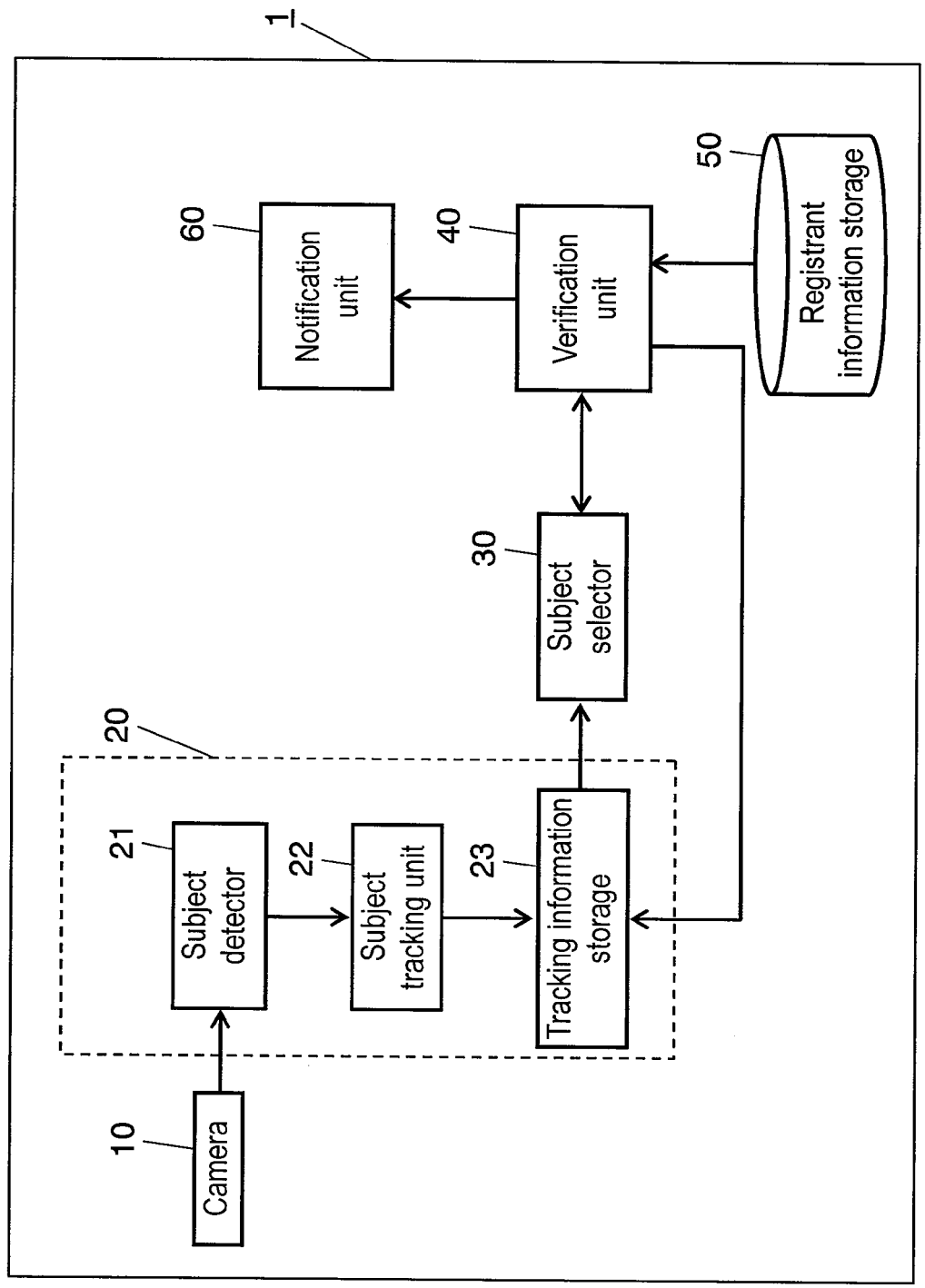

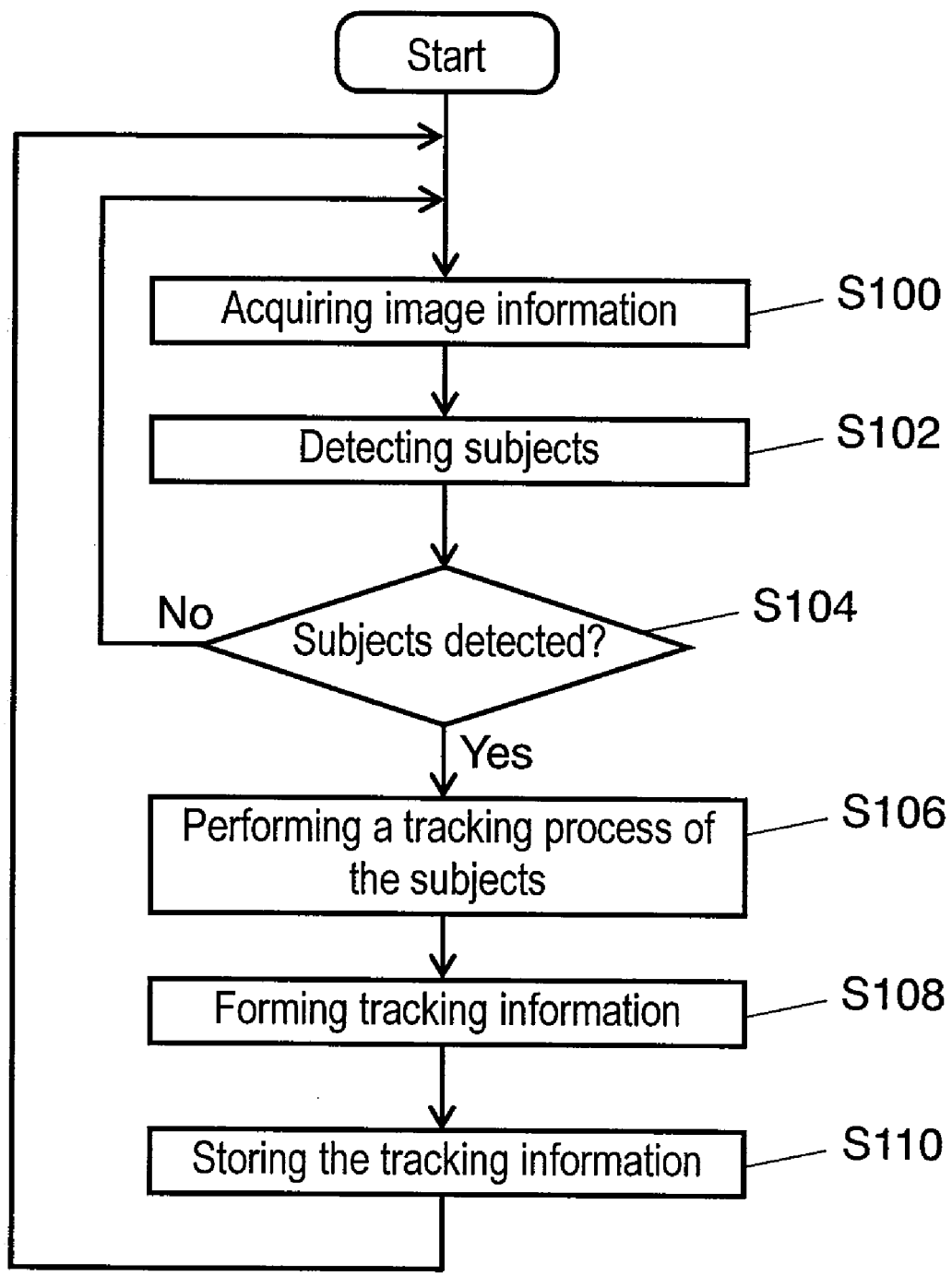

FIG. 3

| Photographing time | T0 | T1 | T2 | T3 | T4 |
|---|---|---|---|---|---|
| Frame number | 0 | 1 | 2 | 3 | 4 |
| Information of subject 200 | ·Subject image<br>·Location information<br>·Successful verification | ·Subject image<br>·Location information | ·Subject image<br>·Location information<br>·Successful verification | ·Subject image<br>·Location information | ·Subject image<br>·Location information |
| Information of subject 201 | None | ·Subject image<br>·Location information<br>·Successful verification | ·Subject image<br>·Location information | ·Subject image<br>·Location information | ·Subject image<br>·Location information<br>·Successful verification |
| Information of subject 202 | None | None | None | ·Subject image<br>·Location information<br>·Successful verification | ·Subject image<br>·Location information |

500

OBJECT VERIFICATION DEVICE AND OBJECT VERIFICATION METHOD

This application is a U.S. National Phase Application of PCT International Application PCT/JP2007/065392.

TECHNICAL FIELD

The present invention relates to an apparatus and method for verifying subjects, and more particularly to an apparatus and method for verifying simultaneously photographed subjects.

BACKGROUND ART

Various monitoring devices with cameras, infrared sensors, or the like have been developed to monitor and detect people entering and leaving buildings, sites, and facilities or walking on the street as subjects, thereby identifying suspicious individuals.

On the other hand, in addition to identity verification using IC cards, various user authentication methods for access are in practical use based on what is called biometric information unique to the authenticatee. Such biometric information includes a fingerprint pattern, an iris pattern, blood vessel patterns in the hand, arm, and back of the eye, and facial characteristics.

Of these biometric authentication methods, an authentication method based on facial characteristics (hereinafter, face authentication) is implemented in various monitoring devices because of their simplicity in structure and authentication. Such monitoring devices include room entry control systems installed inside or at the entrances to buildings, buildings, premises, and facilities.

Face authentication is performed as follows. The authenticatee (hereinafter, the subject) is photographed including his/her face to generate a facial image, which is used to generate authentication information. The authentication information is compared with registered authentication information (registered authentication information) and if they coincide with each other, the subject is authenticated as a registered one.

In the case of monitoring devices, people moving through area under surveillance are detected and tracked based on the difference between the background image in the area and an input image at the time of being photographed (see, for example, Patent Document 1 below).

In the case of monitoring devices for room entry control, people entering and leaving rooms or buildings are tracked to check their flow lines so as to determine whether the people are already registered or not (see, for example, Patent Document 2 below).

These conventional devices, however, have a drawback that the time required to verify people in the image area increases with increasing number of people. As another drawback, when the monitoring devices track and verify people moving from the places of the devices, the time required to obtain the verification results greatly varies depending on the photographic environment such as lighting conditions at each photographing time, facial direction, and the camera-to-subject distance.

Under such circumstances, when performing real-time tracking and verifying of moving subjects, the monitoring devices need to complete photographing and verification processes within the time in which the subjects can be tracked so as to prevent insufficient monitoring. This requires the monitoring devices to have high processing capability. As a result, these monitoring devices are undesirably large in circuit size to achieve parallel processing and high-speed processing, and hence expensive.

Patent Document 1: Japanese Patent Unexamined Publication No. H08-205131
Patent Document 2: Japanese Patent Unexamined Publication No. 2004-185484

SUMMARY OF THE INVENTION

To solve the aforementioned problem, an object of the present invention is to provide an apparatus and method for verifying a large number of moving subjects at low cost.

A subject verification apparatus according to the present invention comprises: a photographing unit for continuously photographing a plurality of subjects; a subject detector for detecting subject images of each of the subjects from a plurality of pieces of image information photographed by the photographing unit; a subject tracking unit for tracking each of the subjects based on the movement of the subject images corresponding to each of the subjects, thereby forming tracking information of each of the subjects; a tracking information storage for storing the tracking information of each of the subjects; a subject selector for selecting a subject to be verified from the plurality of subjects based on the tracking information stored in the tracking information storage; and a verification unit for verifying the subject selected by the subject selector.

With this configuration, the subject verification apparatus verifies a subject selected from a plurality of subjects based on tracking information. As a result, the apparatus can prevent an increase in the time required for verifying tracked moving subjects with increasing number of photographed subjects.

Another subject verification apparatus according to the present invention is used by being connected to a photographic device for continuously photographing a plurality of subjects and maintaining tracking history information and subject image information of each of the subjects based on the movement of subject images of each of the photographed subjects, the subject verification apparatus comprising: a receiver for receiving the tracking history information from the photographic device; a received information storage for storing the tracking history information; a subject selector for selecting a subject to be verified from the plurality of subjects based on the tracking information stored in the received information storage; an image transmission controller for acquiring the subject images corresponding to the selected subject from the photographic device; and a verification unit for verifying the subject images acquired by the image transmission controller.

With this configuration, the subject verification apparatus selects a subject to be verified based on tracking history information acquired from the photographic device, and acquires the subject image information corresponding only to the selected subject from the photographic device. As a result, the apparatus can prevent an increase in the amount of data to be acquired from the photographic device with increasing number of photographed subjects. This enables the apparatus to track and verify a large number of subjects in the case of acquiring subject image information for verification over a network.

A subject verification method according to the present invention verifies subjects by using a subject verification apparatus including a photographing unit for photographing subjects and a tracking information storage for storing tracking information obtained by tracking the subjects, the subject verification method comprising: a photographing step for continuously photographing a plurality of subjects with the photographing unit; a subject detection step for detecting subject images of each of the subjects from the plurality of pieces of image information photographed by the photographing unit; a subject tracking step for tracking each of the subjects based on the movement of the subject images corresponding to each of the subjects; a tracking information forming step for forming the tracking information of each of the subjects; a storing step for storing the tracking information of each of the subjects in the tracking information storage; a subject selection step for selecting a subject to be verified from the plurality of subjects based on the tracking information stored in the tracking information storage; and a verification step for verifying the subject selected in the subject selection step.

This subject verification method can select a subject to be verified from a plurality of subjects based on tracking information, thereby preventing an increase in the time required for verifying tracked moving subjects with increasing number of photographed subjects.

BRIEF DESCRIPTION OF THE DRAWINGS

FIG. 1 is a block diagram showing a structure of a subject verification apparatus according to a first embodiment of the present invention.

FIG. 2 is a flowchart of a tracking process of the subject verification apparatus according to the first embodiment.

FIG. 3 is a schematic diagram showing tracking information of the subject verification apparatus according to the first embodiment.

Figure 4:
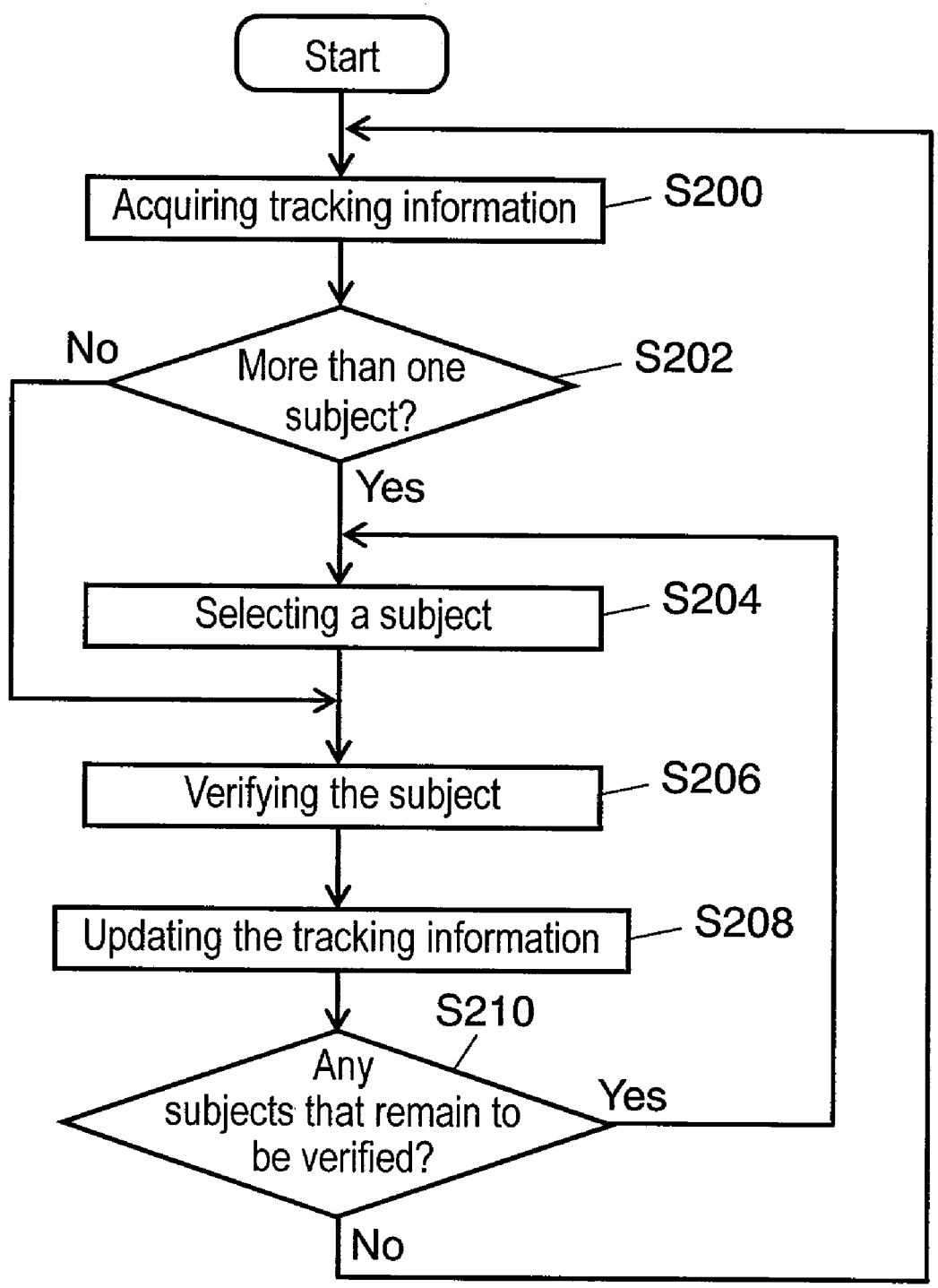
FIG. 4 is a flowchart of a verification process of the subject verification apparatus according to the first embodiment.

REFERENCE MARKS IN THE DRAWINGS 1, 2, 3 subject verification apparatus
4 photographic device
10 camera
20 tracking processor
21 subject detector
22 subject tracking unit
23 tracking information storage
25 interface unit (IF unit)
30 subject selector
40 verification unit
50 registrant information storage
60 notification unit
70 input unit
80 transceiver
81 image transmission controller
82 received information storage
100 image area
200, 201, 202 subject
400, 401, 402 flow line
500 tracking information
600 network
S100 photographing step
S102 subject detection step
S106 subject tracking step
S108 tracking information forming step
S110 storing step
S204, S408, S604 subject selection step
S206 verification step
S208 updating step

DETAILED DESCRIPTION OF PREFERRED EMBODIMENTS

Embodiments of the present invention will be described as follows with reference to the accompanied drawings.

First Embodiment

A subject verification apparatus of a first embodiment of the present invention operates as follows. The apparatus continuously photographs a plurality of moving subjects, tracks the subjects based on the photographed image information, selects a subject to be verified from the subjects based on the tracking information, and verifies the subject image of the selected subject.

The process for tracking a plurality of subjects based on the image information and then forming the tracking information is hereinafter referred to as "tracking process". The process for selecting a subject to be verified from the plurality of subjects based on the tracking information and verifying the subject image of the selected subject is hereinafter referred to as "verification process". The tracking process requires an amount of time that is scarcely affected by the photographic environment. The verification process, on the other hand, requires an amount of time that largely depends on the photographic environment and that also increases with increasing number of subjects to be verified.

The subject verification apparatus verifies a subject selected from a plurality of subjects in the image area, thereby preventing an increase in the time required for the verification process with increasing number of subjects. The time required for the verification process that largely depends on the photographic environment is thus prevented from increasing, so that the tracking and verification processes of a plurality of subjects in the image area can be completed within a predetermined time period.

Examples of the subject include the faces, eyes, irises, and bodies of the humans, vehicles, and animals. In the first embodiment of the present invention, the subject refers to a human face.

The following is a description, with reference to FIG. 1, of the subject verification apparatus according to the first embodiment. FIG. 1 is a block diagram showing a structure of subject verification apparatus 1 of the first embodiment.

In FIG. 1, subject verification apparatus 1 includes camera 10, subject detector 21, subject tracking unit 22, tracking information storage 23, subject selector 30, registrant information storage 50, verification unit 40, and notification unit 60. Camera 10 is a photographing unit to continuously photograph a plurality of subjects. Subject detector 21 detects subject images of each of the subjects from the pieces of image information photographed by camera 10. Subject tracking unit 22 tracks each of the subjects based on the movement of the subject images, thereby forming tracking information of each of the subjects. Tracking information storage 23 stores the tracking information. Subject selector 30 selects a subject to be verified from the plurality of subjects based on the tracking information. Registrant information storage 50 stores verification information required for subject verification (hereinafter, the verification information is referred to as "registered verification information"). Verification unit 40 forms verification information based on the selected subject images, compares the verification information with the registered verification information, and outputs the verification result. Notification unit 60 notifies the verification result.

Camera 10 continuously photographs a plurality of subjects in the image area. Examples of camera 10 include monochrome and color cameras using a CCD, a CMOS or the like as an image pickup device.

Subject detector 21 detects subject images of each of the subjects from the pieces of image information continuously photographed (hereinafter, the image information is referred to as "frame image").

Subject tracking unit 22 detects the movement of the subject images detected from each frame image on the coordinate. Here, regions with a high degree of coincidence are regarded as the regions of the same subject. An example to determine the degree of coincidence is a gray-scale pattern matching method such as a cross-correlation method and a multiple similarity method.

More specifically, subject tracking unit 22 detects the difference between the frame images, thereby detecting a motion vector indicating the motion direction and length of each subject from the movement of the subject images. Subject tracking unit 22 then sequentially stores the tracks (hereinafter, "flow lines") of the detected motion vector, thereby tracking each subject. Tracking information storage 23 stores the tracking history information and the subject image information of each subject as tracking information. The addition of the tracking information is performed at intervals of time T, which is predetermined based on the assumed moving speed of the subjects. The time T may be changed according to on the moving speed of the subjects. As will be described later, the tracking information is updated every time verification occurs.

Tracking information storage 23 stores the tracking information of the subjects in a well-known information recording medium such as a hard disk drive (HDD) or a random access memory (RAM).

Subject selector 30 selects a subject to be verified based on the tracking information stored in tracking information storage 23, and outputs the subject images of the selected subject to verification unit 40. How to select subjects will be described in detail later.

As registrant information storage 50, a well-known information recording medium such as a hard disk drive (HDD) or a random access memory (RAM) stores the registered verification information of the registrants. The registered verification information includes gray-scale component information, frequency component information, gray-scale image information, color information, and shape information, all of which are statistical characteristic amounts of subjects. The characteristic amounts can be extracted, for example, from the principal component analysis of gray-scale information using a well-known eigenface method (for example, M. Turk and A. Pentland, "Eigenfaces for Recognition", Journal of Cognitive Neuroscience, March 1991).

Verification unit 40 forms verification information based on the selected subject images, and compares the verification information with the registered verification information so as to verify the subject. Verification unit 40 then assigns the verification information to the information (positions) corresponding to the subject images of the verified subject so as to update the tracking information. The presence or absence of verification of each of the subjects is recorded in the tracking information.

Notification unit 60 notifies the verification result to the manager of the apparatus. If the verification result coincides, for example, with the information of a suspicious individual registered in the apparatus, notification unit 60 notifies it to the manager by sounding an alarm or providing some other warning. Notification unit 60 may alternatively notify the verification result by displaying it on the display device. This helps the manager of the apparatus to readily find the specific subject when the number of subjects to be verified is large.

The tracking process of subject verification apparatus 1 is described as follows with reference to FIG. 2, which is a flowchart of the tracking process.

First, in photographing step S100, camera 10 continuously photographs moving subjects so as to sequentially acquire frame images, thereby acquiring the image information of the moving subjects.

In subject detection step S102, subject detector 21 detects subject images from each of the continuously photographed frame images.

In Step S104, subject detector 21 detects whether subjects have been detected or not based on the detection result of subject detector 21. When no subjects have been detected (NO), the process goes back to photographing step S100 to acquire frame images. When subjects have been detected (YES), on the other hand, subject tracking unit 22 detects the difference between the frame images, thereby detecting the movement of the subject images. In subject tracking step S106, subject tracking unit 22 performs a tracking process of the subjects. More specifically, subject tracking unit 22 detects motion vectors indicating the motion directions and lengths of the subjects, and detects the flow lines of the subjects from the history of the motion vectors.

In tracking information forming step S108, subject tracking unit 22 forms tracking information 500 shown in FIG. 3. Tracking information 500 is formed based on the tracking history information and subject image information. The tracking history information includes the location information of each detected motion vector of each subject and later-described verification information. In storing step S110, tracking information storage 23 stores tracking information 500.

Then, the process goes back to photographing step S100 in which camera 10 acquires new frame images.

In this manner, photographing step S100, subject detection step S102, subject tracking step S106, tracking information forming step S108, and storing step S110 are repeated. Thus, in storing step S110, subject tracking unit 22 records the information obtained by tracking the plurality of subjects in tracking information 500 at each photographing time in chronological order. The information to be recorded includes tracking history information such as frame information, location information of each subject and verification information, and subject image information indicating subject images of the subjects detected from each frame image. As will be described later, subject tracking unit 22 also stores in tracking information 500 completion information (unillustrated) indicating the completion of tracking when a subject being tracked stops for more than a predetermined time.

As will be described later, the verification information includes the history of a verification process such as the presence or absence of a verification process, the presence or absence of a verification result, and the completion time of the verification process, all of which are assigned by verification unit 40. The location information is coordinate information indicating the positions in the image area from which subject images of subjects have been detected. The subject image indicates image information of a subject, such as a facial image.

Tracking information 500 is used to detect the number of times of verification of each subject and the time when each subject is verified. Thus, tracking information 500 can be used to select a subject under predetermined conditions and to search for the subject images corresponding to the selected subject. The predetermined conditions include the number of times of verification, the verification time, and the position (coordinate) at which a subject image is detected.

The verification process of subject verification apparatus 1 is described as follows with reference to FIG. 4, which is a flowchart of the verification process.

First, in Step S200, subject selector 30 acquires tracking information 500 stored in tracking information storage 23. In Step S202, subject selector 30 determines whether more than one subject is to be verified or not based on tracking information 500.

When subject selector 30 has determined that only one subject is to be verified in verification unit 40 (NO), the process proceeds to verification step S206. When more than one subject has been determined to be verified (YES), on the other hand, the process proceeds to subject selection step S204. In subject selection step S204, subject selector 30 selects subject images of one subject to be verified from the subjects under the predetermined conditions. The predetermined conditions include giving priority to subjects that have been verified less number of times or to subjects that remain to be verified. Thus, the subject to be verified is selected under the predetermined conditions based on tracking history information such as frame information, location information of each subject (coordinate information at which each subject has been detected) and verification information, and subject image information, all of which are stored in tracking information 500. How to select subjects will be described in detail later.

Next, verification unit 40 forms verification information based on the subject images selected by subject selector 30. In verification step S206, verification unit 40 compares the verification information with the registered verification information in registrant information storage 50 so as to verify the subject. In tracking information updating step S208, verification unit 40 assigns history information including information indicating "successful verification" and the completion time of verification to the information (positions) corresponding to the subject images of the subject verified in verification unit 40 so as to update tracking information 500. The presence or absence of verification of each of the subjects is recorded in tracking information 500.

In Step S210, subject selector 30 searches tracking information 500 and determines whether there are any subjects that remain to be verified. When there are any subjects that remain to be verified (YES), the process goes back to subject selection step S204, so that subject selection step S204 through tracking information updating step S208 are repeated. As a result, verification unit 40 verifies the subject and assigns history information including information indicating "successful verification" and the completion time of verification to tracking information 500 so as to update tracking information 500. When there are no subjects that remain to be verified (NO), on the other hand, the process goes back to Step S200.

In this manner, verification unit 40 verifies the subject images of a subject selected by subject selector 30, so that subject verification apparatus 1 can prevent an increase in the verification time with increasing number of subjects in the image area.

As shown in FIG. 1, the tracking result obtained in tracking processor 20 is stored in tracking information storage 23 as tracking information 500, based on which a verification process is performed by subject selector 30 and verification unit 40. Subject verification apparatus 1 may alternatively provide separate processing units (both unillustrated) to perform the tracking and verification processes separately. It is also possible to provide a single processing unit having a proportioning controller (unillustrated) which distributes load between the tracking and verification processes.

How to select subjects is described as follows in detail with reference to FIG. 5, which is a schematic diagram showing how to select subjects in subject verification apparatus 1. The following description considers the case where the predetermined conditions indicate giving priority to subjects that have been verified less number of times. When more than one subject has been verified the same number of times, priority is given to subjects that were first verified earlier than others.

Figure 5:
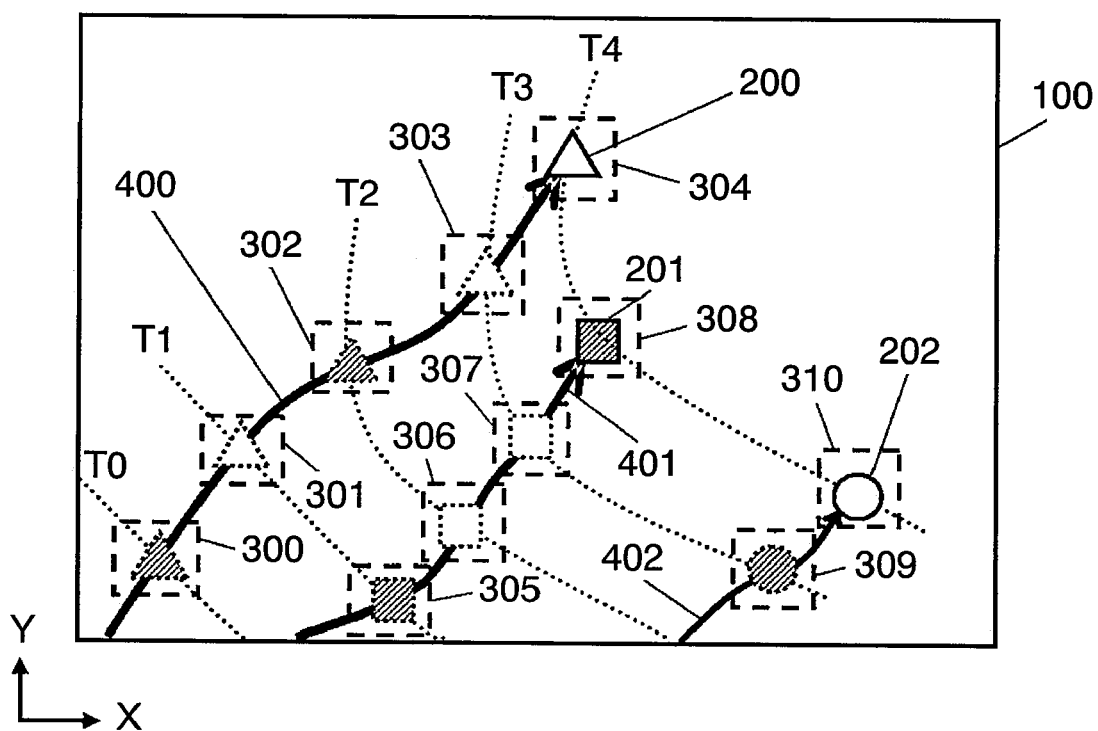
FIG. 5 is a schematic diagram showing how to select subjects in the subject verification apparatus according to the first embodiment.

FIG. 5 shows how subjects photographed by camera 10 undergo a verification process at predetermined time intervals based on tracking information 500 of FIG. 3.

In FIG. 5, image area 100 of camera 10 contains subjects 200, 201, and 202 between times T0 and T4. It is assumed that subjects 200, 201, and 202 have moved along flow lines 400, 401, and 402, respectively. The verification process is described as follows in chronological order.

At time T0, image area 100 of camera 10 contains subject 200. Subject tracking unit 22 detects the subject image and location information of subject 200 from region 300 detected by subject detector 21. The detected information is recorded in tracking information 500.

As a result, subject selector 30 selects the subject image of subject 200 based on tracking information 500 at time T0. In other words, the subject image detected from region 300 is selected.

Verification unit 40 forms verification information based on the subject image detected from region 300, compares the verification information with the registered verification information, and outputs the verification result. Verification unit 40 then assigns verification information indicating "successful verification" to the information area of subject 200 of tracking information 500 stored in tracking information storage 23.

At time T1, image area 100 of camera 10 contains subjects 200 and 201. Subject tracking unit 22 detects the subject images and location information of subjects 200 and 201 from regions 301 and 305, respectively, detected by subject detector 21. Tracking information storage 23 records the information thus detected in tracking information 500. At time T1, subjects 200 and 201 have been verified twice and once, respectively. Therefore, in subject selection step S204, subject selector 30 selects the subject image of subject 201, which has been verified less number of times based on tracking information 500 at time T1. In other words, the subject image detected from region 305 is selected.

Verification unit 40 forms verification information based on the subject image detected from region 305, compares the verification information with the registered verification information, and outputs the verification result. Verification unit 40 then assigns verification information indicating "successful verification" to the information area of subject 201 of tracking information 500 stored in tracking information storage 23.

At time T2, image area 100 of camera 10 contains subjects 200 and 201. Subject tracking unit 22 detects the subject images and location information of subjects 200 and 201 from regions 302 and 306, respectively, detected by subject detector 21. Tracking information storage 23 records the information thus detected in tracking information 500.

Subject selector 30 selects the subject image of subject 200, which has been verified less number of times and which was first verified earlier than the other subject, based on tracking information 500 at time T2. In other words, the subject image detected from region 302 is selected. When there are no subjects that remain to be verified in the plurality of subjects, subject selector 30 may select the subject image of a subject in the following conditions in subject selection step S204. That is, subject selector 30 may select the subject image of subject 200, which has not undergone a verification process for the longest period since the last verification, based on tracking information 500 at time T2.

Verification unit 40 forms verification information based on the subject image detected from region 302, compares the verification information with the registered verification information, and outputs the verification result. Verification unit 40 then assigns verification information indicating "successful verification" to the information area of subject 200 of tracking information 500 stored in tracking information storage 23.

At time T3, image area 100 of camera 10 contains subjects 200, 201, and 202. Subject tracking unit 22 detects the subject images and location information of subjects 200, 201, and 202 from regions 303, 307, and 309, respectively, detected by subject detector 21. Tracking information storage 23 records the information thus detected in tracking information 500. At time T3, subjects 200, 201, and 202 have been verified four times, three times, and once, respectively.

In subject selection step S204, subject selector 30 selects the subject image of subject 202, which has been verified the least number of times based on tracking information 500 at time T3. Alternatively, subject selector 30 may preferentially select the subject image of subject 202, which remains to be verified. In other words, the subject image detected from region 309 is selected.

Verification unit 40 forms verification information based on the subject image detected from region 309, compares the verification information with the registered verification information, and outputs the verification result. Verification unit 40 then assigns verification information indicating "successful verification" to the information area of subject 202 of tracking information 500 stored in tracking information storage 23.

At time T4, image area 100 of camera 10 contains subjects 200, 201, and 202. Subject tracking unit 22 detects the subject images and location information of subjects 200, 201, and 202 from regions 304, 308, and 310, respectively, detected by subject detector 21. Tracking information storage 23 records the information thus detected in tracking information 500.

Subject selector 30 selects the subject image of subject 201, which has been verified less number of times and which was first verified earlier than others based on tracking information 500 at time T4. In other words, the subject image detected from region 308 is selected.

Verification unit 40 forms verification information based on the subject image detected from region 308, compares the verification information with the registered verification information, and outputs the verification result. Verification unit 40 then assigns verification information indicating "successful verification" to the information area of subject 201 of tracking information 500 stored in tracking information storage 23.

Thus, subject selector 30 selects the subject image of a subject to be verified under the predetermined conditions.

As described hereinbefore, subject verification apparatus 1 of the present embodiment verifies a subject selected from a plurality of subjects contained in image area 100, thereby preventing an increase in the verification time with increasing number of subjects. The time required for the verification process that largely depends on the photographic environment is thus prevented from increasing, so that the tracking and verification processes of the plurality of subjects in image area 100 can be completed within a predetermined time period.

In subject verification apparatus 1 of the present embodiment, the tracking results obtained by tracking processor 20 are stored in tracking information storage 23 as tracking information 500, based on which a verification process is performed by subject selector 30 and verification unit 40. Therefore, subject verification apparatus 1 may perform the tracking and verification processes either in separate processing units or in a single processing unit which distributes capabilities between the tracking and verification processes. When the single processing unit distributes capabilities between the tracking and verification processes, the distribution ratio may be controlled according to the number of subjects to be verified by verification unit 40. This ensures verification without failure in tracking the subjects.

When the verification result indicates that the subject is already registered, notification unit 60 provides warning or displays the verification result, so that the manager of the apparatus can readily find the specific subject.

Second Embodiment

A subject verification apparatus of a second embodiment of the present invention can change the conditions for selecting a subject to be verified according to the input from the manager of the subject verification apparatus.

A first input from the manager indicates that priority is given to immediacy. This means that the subject verification apparatus operates with an emphasis on showing the verification result immediately by, for example, displaying the subject on a display device or the like.

When the first input is received, the subject verification apparatus hardly needs to process the detection results in the past, and only verifies the latest image of the detection results and displays the verification result. Since the subject detection results in the past are not displayed, the subject verification apparatus can prevent confusion.

A second input indicates that priority is given to both immediacy and verification accuracy. This means that the subject verification apparatus operates with an emphasis on not only displaying but also storing and recording verification results.

When the second input is received, the subject verification apparatus preferentially verifies the latest detected subject. When there is no latest detected subject, a subject that remains to be verified is selected from the tracking results in the past and verified.

A third input indicates that priority is given to verification accuracy. This means that the subject verification apparatus operates with an emphasis on the accumulated information and verification accuracy than the real-time tracking of verification results.

When the third input is received, the subject verification apparatus starts a verification process when people as subjects have passed the apparatus. This allows subject images to be selected and verified in order of best to worst in terms of photographic conditions, thereby obtaining the best verification result. The photographic conditions indicate a descending order of size of the face image, an order of being closer to the full-face view, or the like.

Figure 6:
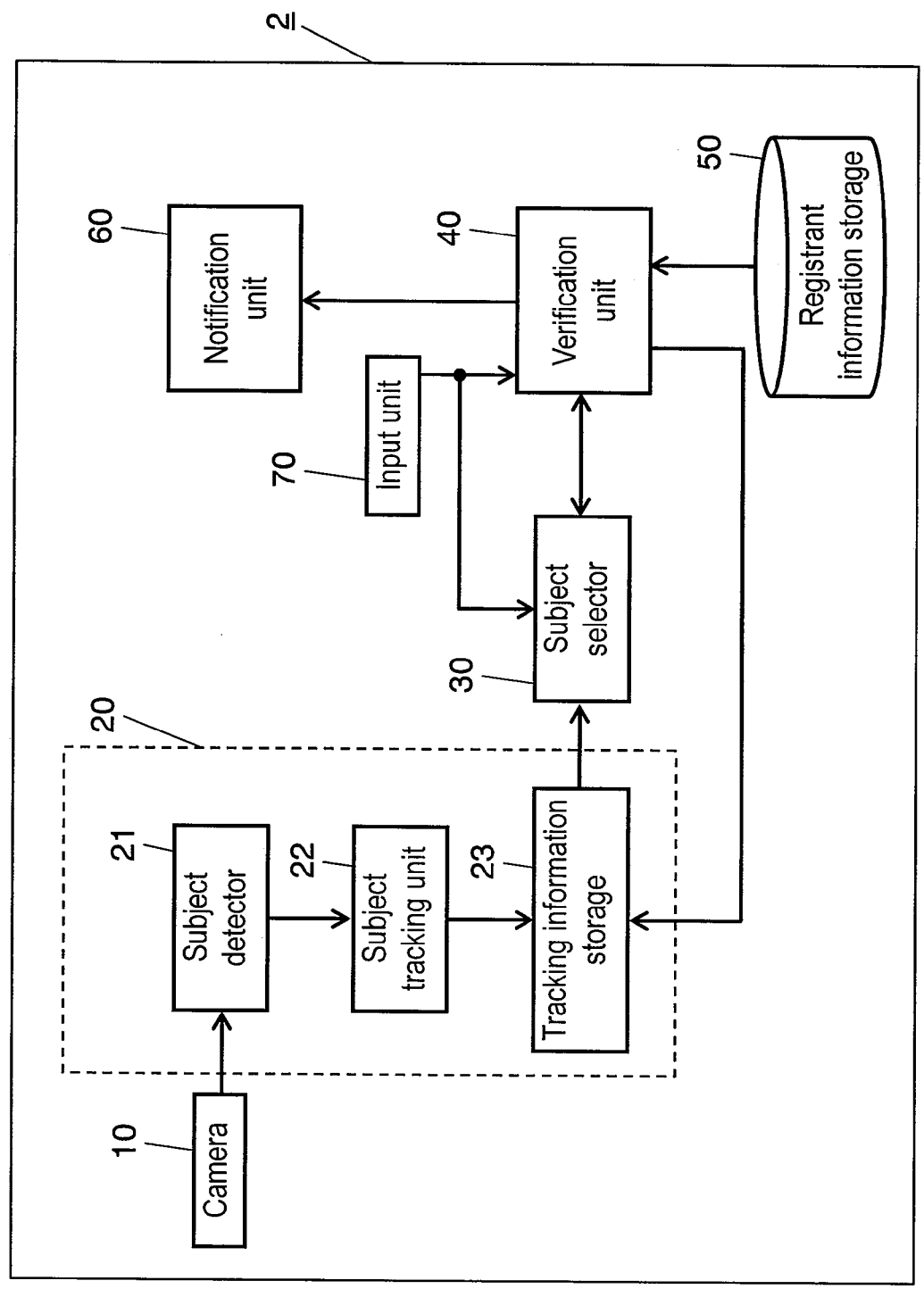
FIG. 6 is a block diagram showing a structure of a subject verification apparatus according to a second embodiment of the present invention.

The structure of subject verification apparatus 2 of the second embodiment of the present invention is described with reference to FIG. 6, which is a block diagram showing the structure. Like components are labeled with like reference numerals with respect to the first embodiment, and the description thereof will be omitted. Subject verification apparatus 2 of the second embodiment performs the same tracking process as in subject verification apparatus 1 of the first embodiment as shown in FIG. 2.

Subject verification apparatus 2 differs from subject verification apparatus 1 in having input unit 70, which provides subject selector 30 and verification unit 40 with an input to change selection conditions for selecting subjects.

The manager of subject verification apparatus 2 performs an input operation through input unit 70 according to the desired priority for verification. Input unit 70 includes first, second, and third buttons (all unillustrated) for the first, second, and third inputs, respectively. Subject verification apparatus 2 determines the selection conditions to select subjects according to the button pushed by the manager, and outputs them to subject selector 30 and verification unit 40.

As will be described later, subject selector 30 and verification unit 40 may change the verification process according to the selection conditions.

The overall verification process of subject verification apparatus 2 is described as follows with reference to FIG. 7, which is a flowchart of the overall verification process.

Figure 7:
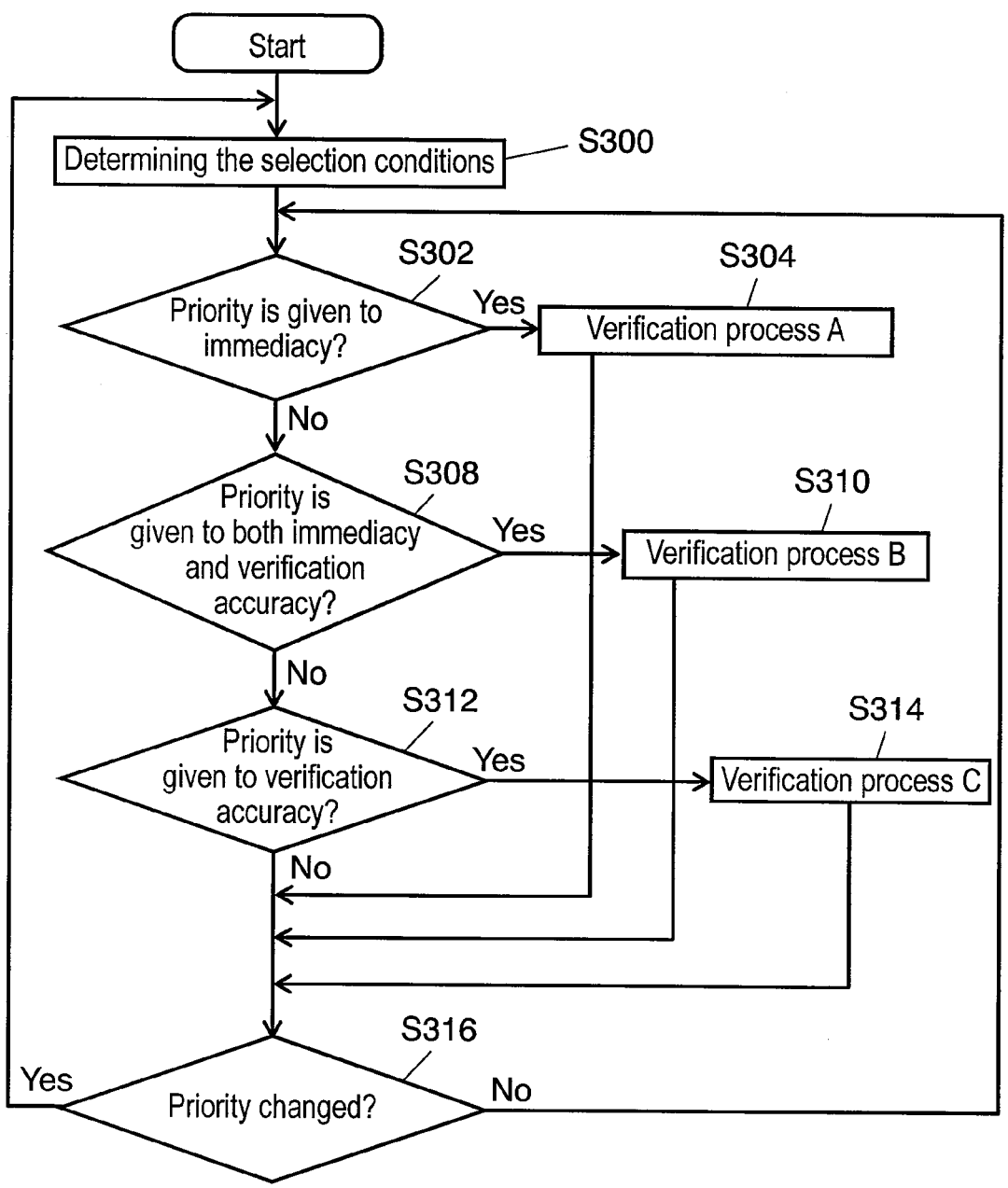
FIG. 7 is a flowchart of the overall operation of the subject verification apparatus according to the second embodiment.

As shown in FIG. 7, in Step S300, subject verification apparatus 2 determines the selection conditions according to the input entered to input unit 70, and performs the verification process corresponding to the determined selection conditions.

In Step S302, when the first button of input unit 70 is pushed, it is determined that priority is given to the immediacy of verification results (YES). As a result, subject verification apparatus 2 performs verification process "A" in Step S304. When the first button is not pushed (NO), on the other hand, the process proceeds to Step S308. As will be described later, in verification process "A", the latest subject image of a subject is preferentially selected from the detected subject images and verified.

In Step S308, when the second button of input unit 70 is pushed, it is determined that priority is given to both the immediacy and verification accuracy of verification results (YES). As a result, subject verification apparatus 2 performs verification process "B" in Step S310. When the second button is not pushed (NO), on the other hand, the process proceeds to Step S312. As will be described later, in verification process "B", the latest subject image of a subject photographed by camera 10 is preferentially verified. When there is no latest subject image, a subject that remains to be verified is selected from the tracking results in the past and verified.

In Step S312, when the third button of input unit 70 is pushed, it is determined that priority is given to verification accuracy (YES). As a result, subject verification apparatus 2 performs verification process "C" in Step S314. When the third button is not pushed (NO), on the other hand, the process proceeds to Step S316. As will be described later, in verification process "C", the verification process is started when a subject has passed apparatus 2. When the subject has passed apparatus 2, subject selector 30 selects a designated number of subject images from the image information of the same subject in descending order of size of the regions of the subject images. Then, verification unit 40 verifies the subject. When the subject is a human face, subject selector 30 selects the designated number of subject images in order of being closer to the full-face view. Then, verification unit 40 verifies the subject. As a result, subject verification apparatus 2 can provide verification result having the highest accuracy.

In step S316, it is determined whether a different button of input unit 70 has been pushed to change the priority. When a different button has been pushed (YES), the process returns to Step S300 to detect which button in input unit 70 has been pushed. When a different button has not been pushed (NO), the process returns to Step S302 to determine the selection conditions according to the enter button for selecting priority and to perform the verification process corresponding to the determined selection conditions.

The following is a detailed description of each of verification processes A, B, and C in subject verification apparatus 2. First, verification process "A" is described as follows with reference to FIG. 8, which is a flowchart of verification process "A".

Figure 8:
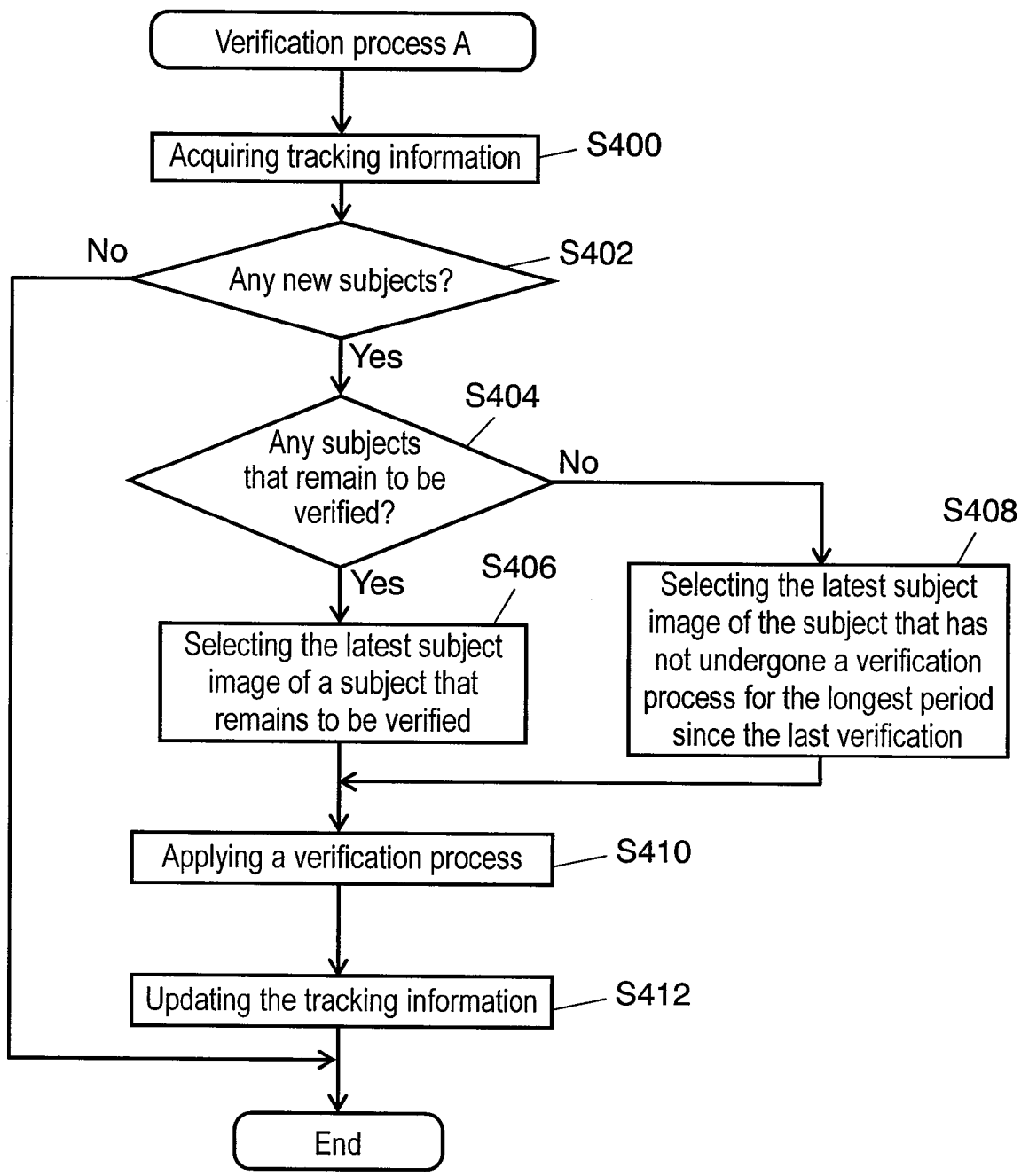
FIG. 8 is a flowchart of verification process "A" in the subject verification apparatus according to the second embodiment.

In verification process "A" of FIG. 8, in Step S400, subject selector 30 acquires tracking information 500 from tracking information storage 23. In Step S402, subject selector 30 determines the presence or absence of new subject images.

When there are no new subject images detected in Step S402 (NO), the process is terminated. When there are new subject images detected (YES), on the other hand, the process proceeds to Step S404 in which subject selector 30 searches tracking information 500 and determines whether there are any subjects that remain to be verified.

When there are no subjects that remain to be verified (NO), subject selector 30 searches tracking information 500. In subject selection step S408, subject selector 30 preferentially selects the latest subject image of the subject that has not undergone a verification process for the longest period since the last verification. When there are subjects that remain to be verified (YES), on the other hand, subject selector 30 searches tracking information 500. In Step S406 subject selector 30 selects the latest subject image of a subject that remains to be verified.

In Step S410, verification unit 40 applies a verification process to the subject image selected by subject selector 30. In Step S412, when the verification process is completed, verification unit 40 assigns information indicating "successful verification" to the corresponding subject information area in tracking information 500 so as to update tracking information 500.

Thus, verification process "A" provides immediacy by verifying the latest detected subject image.

Next, verification process "B" is described as follows with reference to FIG. 9, which is a flowchart of verification process "B".

Figure 9:
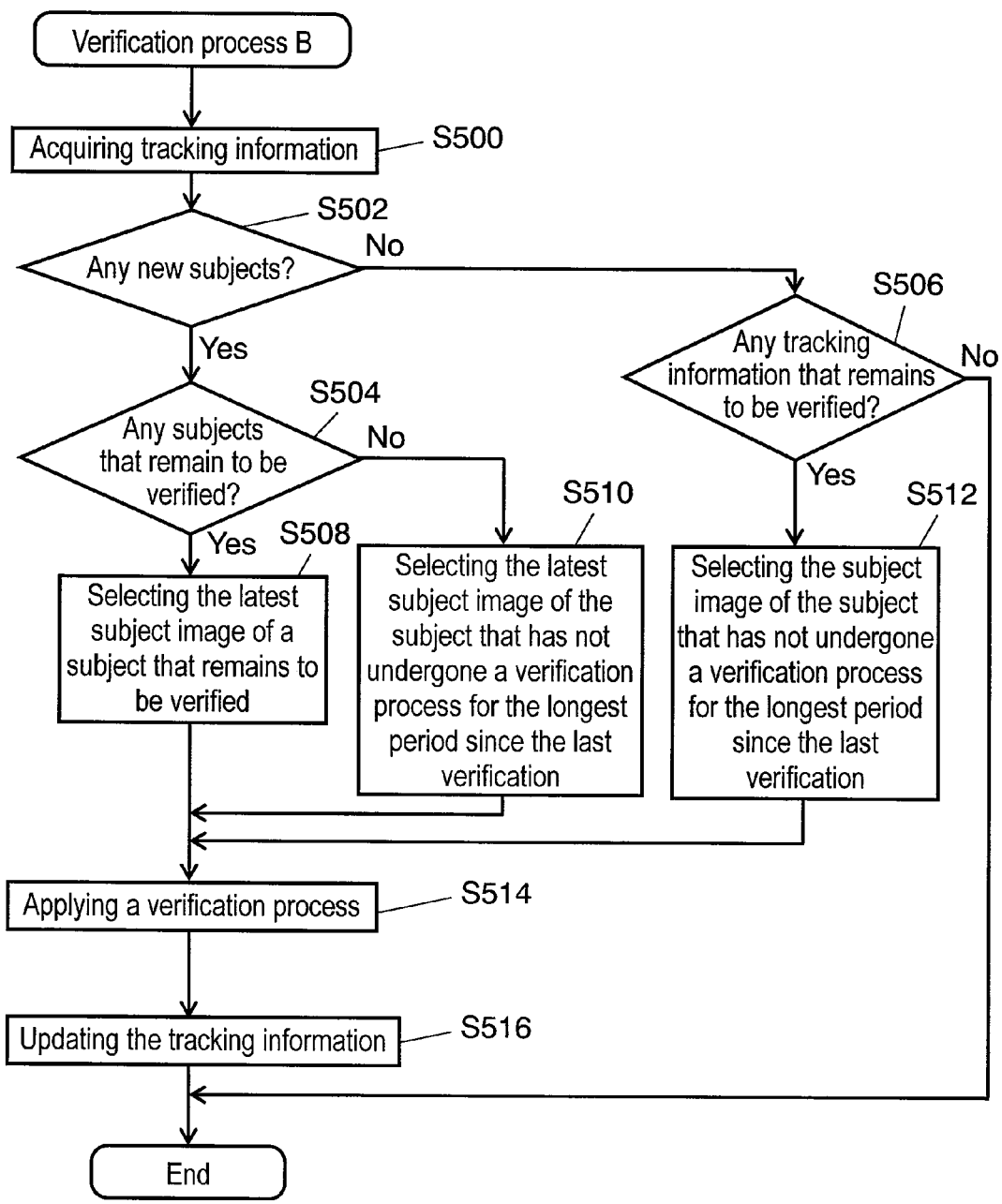
FIG. 9 is a flowchart of verification process "B" in the subject verification apparatus according to the second embodiment.

In verification process "B" of FIG. 9, in Step S500, subject selector 30 acquires tracking information 500 from tracking information storage 23. In Step S502, subject selector 30 determines the presence or absence of new subject images.

When there are no new subject images detected in Step S502 (NO), the process proceeds to Step S506. When there are new subject images detected (YES), on the other hand, the process proceeds to Step S504 in which subject selector 30 searches tracking information 500 and determines whether there are any subjects that remain to be verified.

When there are no subjects that remain to be verified in Step S504 (NO), subject selector 30 searches tracking information 500. In Step S510, subject selector 30 selects the latest subject image of the subject that has not undergone a verification process for the longest period since the last verification. Then, the process proceeds to Step S514. When there are subjects that remain to be verified in Step S504 (YES), on the other hand, subject selector 30 searches tracking information 500. In Step S508, subject selector 30 selects the latest subject image of a subject that remains to be verified. Then, the process proceeds to Step 514.

In Step S506, subject selector 30 searches tracking information 500 and determines whether there is any tracking information that remains to be verified. When there is tracking information that remains to be verified (YES), subject selector 30 searches tracking information 500. In Step S512, subject selector 30 selects the subject image of the subject that has not undergone a verification process for the longest period since the last verification. Then, the process proceeds to Step S514. When there is no tracking information that remains to be verified in Step S506 (NO), on the other hand, the process is terminated.

In Step S514, verification unit 40 applies a verification process to the subject image selected by subject selector 30. In Step S516, when the verification process is completed, verification unit 40 assigns information indicating "successful verification" to the corresponding subject information area in tracking information 500 so as to update tracking information 500.

In this manner, in verification process "B", the latest subject image of a subject is preferentially verified. When there is no latest subject image of the subject, a subject that remains to be verified is selected from the tracking results in the past and verified.

Thus, in verification process "B", when there is no latest detected subject image in the photographic information, a subject to be verified is selected from the previous data. This makes it possible to place priority on the accuracy of verification results while providing a certain degree of immediacy.

Next, verification process "C" is described as follows with reference to FIG. 10, which is a flowchart of verification process "C".

Figure 10:
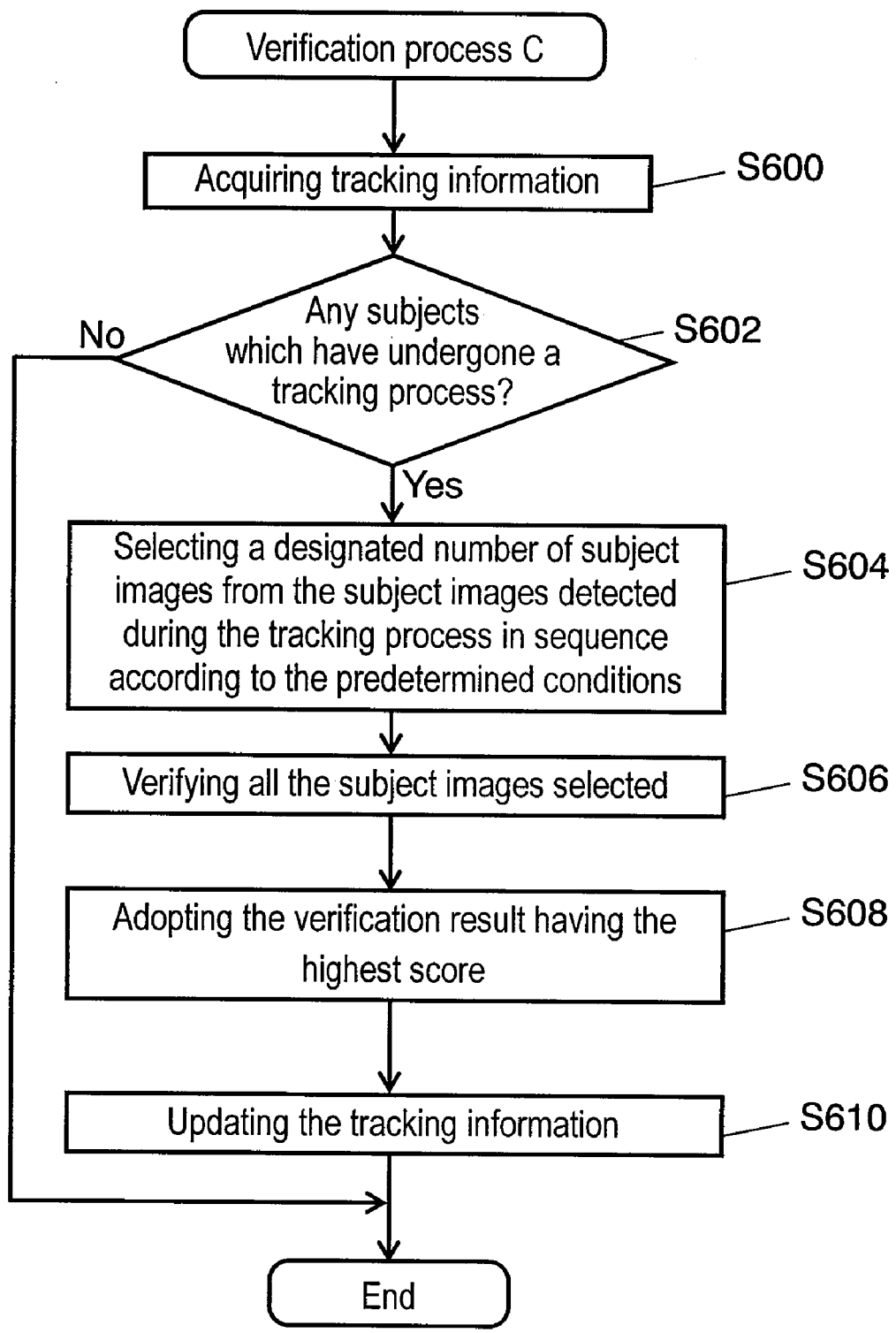
FIG. 10 is a flowchart of verification process "C" in the subject verification apparatus according to the second embodiment.

In verification process "C" of FIG. 10, in Step S600, subject selector 30 acquires tracking information 500 from tracking information storage 23. In Step S602, subject selector 30 determines the presence or absence of subjects which have undergone a tracking process.

In subject verification apparatus 2, the tracking process of a subject is completed when the subject has gotten out of image area 100, and completion information is assigned to tracking information 500. Subject verification apparatus 2 can determine whether the tracking process is completed or not by detecting the completion information. Alternatively, it is possible to assign the completion information also to the subjects that have been in image area 100 for more than a predetermined time period. This allows subjects standing still for some reason in image area 100 to be verified.

In Step 602, when there are no subjects that have undergone a tracking process (NO), the process is terminated.

When there are subjects that have undergone a tracking process (YES), subject selector 30 searches tracking information 500. In Step S604, subject selector 30 selects a designated number of subject images from those detected during the tracking process in sequence according to the predetermined conditions. The sequence according to the predetermined conditions is a descending order of size of the regions of the subject images of the same subject. When the subject is a human face, the sequence is an order of best to worse in terms of photographic conditions, such as an order of being closer to the full-face view.

A specific operation of subject verification apparatus 2 is described as follows with reference to FIG. 11, which is a schematic diagram showing the tracking results of subject 200 in image area 100 of the second embodiment.

Figure 11:
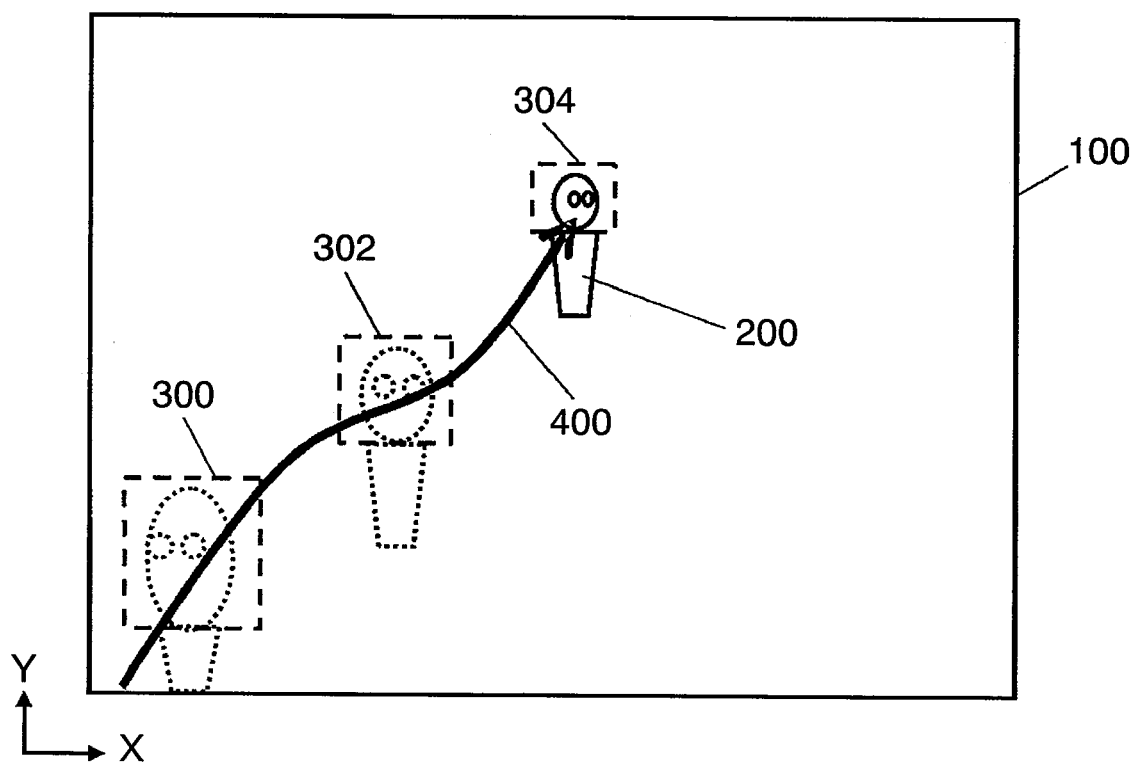
FIG. 11 is a schematic diagram showing tracking results of a subject in the subject verification apparatus according to the second embodiment.

As shown in FIG. 11, subject selector 30 searches tracking information 500 and detects flow line 400 of subject 200. When a predetermined time period has passed after subject 200 has been detected in region 304, completion information is assigned to tracking information 500, so that verification unit 40 performs verification.

Subject selector 30 searches tracking information 500 and detects sizes of the subject images of subject 200 at positions (coordinates) of region 300, 302, and 304. For example, when the designated number is "2", and the predetermined conditions indicate "a descending order of size of the subject images (face images)", subject selector 30 selects the largest subject image detected from region 300, and then selects the second largest subject image detected from region 302.

The following is a description of a case where the designated number is "1", and the predetermined conditions indicate "an order of being closer to the full-face view". In this case, as shown in FIG. 11, subject selector 30 detects the subject image looking slightly to the left from region 300, the subject image in full face from region 302, and the subject image looking to the right from region 304. Of these detection results, subject selector 30 selects the subject image detected from region 302, that is, the subject image of subject 200 in full face.

Other predetermined conditions include an order of having the most to the least preferable luminance distribution for verification unit 40 to perform verification or a descending order of the level of image clarity.

Referring back to the flowchart of FIG. 10, in Step S606, verification unit 40 verifies all the subject images selected by subject selector 30. In Step S608, verification unit 40 adopts the verification result having the highest score.

In Step S610, when the verification process is completed, verification unit 40 assigns information indicating "successful verification" to the corresponding subject information area in tracking information 500 so as to update tracking information 500.

Thus, verification process "C" provides high verification accuracy by selecting a verification result having a high score from a plurality of verification results although incapable of providing high immediacy.

As described hereinbefore, in subject verification apparatus 2 of the second embodiment, the selection conditions are determined according to the input from input unit 70, and the verification process corresponding to the selection conditions is performed. This enables subject verification apparatus 2 to change the verification process according to the priority given to immediacy and verification accuracy. The verification process is changed by an input from the manager in the second embodiment, but may be changed by instructions from software.

Subject verification apparatuses 1 and 2 of the first and second embodiments select subjects to be verified based on the tracking results. Therefore, it is possible to connect subject verification apparatuses 1 and 2 to photographic devices having a function of performing a subject tracking process over the network. This enables subject verification apparatuses 1 and 2 to select necessary subjects from the photographic devices based on the tracking information and to acquire the subject images of the selected subjects from the photographic devices. This structure reduces the amount of data to be transmitted and received between the photographic devices and the subject verification apparatuses. Thus, a subject verification apparatus connected to photographic devices installed in different locations on the network can verify a large number of subjects efficiently.

Figure 12:
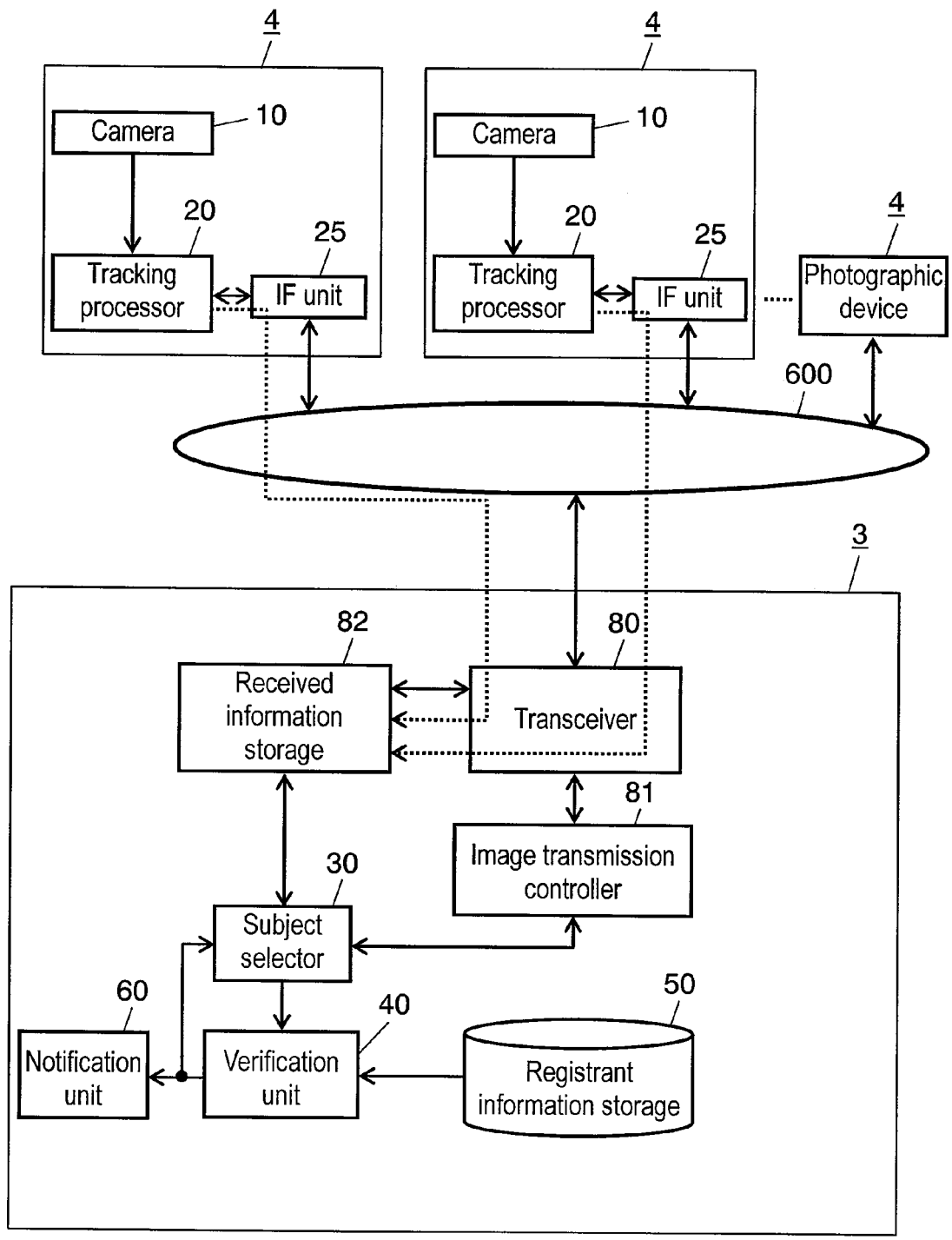
FIG. 12 is a block diagram showing a modified example of the subject verification apparatus according to the second embodiment.

The following is a description, with reference to FIG. 12, of the case where subject verification apparatus 3 is connected over network 600 to a plurality of photographic devices 4 installed in different locations. Subject verification apparatus 3 verifies subjects based on the tracking information received from photographic devices 4. FIG. 12 is a block diagram showing a modified example of the subject verification apparatus of the second embodiment. Like components are labeled with like reference numerals with respect to the first embodiment, and the description thereof will be omitted.

As shown in FIG. 12, photographic devices 4 each include camera 10, tracking processor 20, and interface unit (IF unit) 25. Camera 10 continuously photographs a plurality of subjects. Tracking processor 20 tracks each of the subjects based on the movement of the subject images of each of the subjects photographed by camera 10. Tracking processor 20 then stores tracking history information and subject image information as tracking information 500. Interface unit (IF unit) 25 transmits and receives information to/from subject verification apparatus 3 over network 600.

Photographic devices 4 thus structured operate as follows. Upon request for data from subject verification apparatus 3, photographic devices 4 first transmit the tracking history information contained in tracking information 500 excluding the subject image information. Upon request for subject images, photographic devices 4 selects the subject images of the requested subject from tracking information 500, and transmits them to subject verification apparatus 3.

Subject verification apparatus 3 includes transceiver 80, received information storage 82, subject selector 30, image transmission controller 81, registrant information storage 50, verification unit 40, and notification unit 60. Transceiver 80 transmits and receives information to/from photographic devices 4 over network 600. Received information storage 82 stores the tracking history information received from photographic devices 4. Subject selector 30 selects a subject to be verified from the plurality of subjects based on the tracking history information stored in the received information storage. Image transmission controller 81 acquires the subject image information corresponding to the selected subject from photographic devices 4. Registrant information storage 50 stores the registered verification information of the registrants. Verification unit 40 forms verification information based on the subject image information acquired by image transmission controller 81 and compares the verification information with the registrant information. Notification unit 60 notifies the manager of the apparatus when the two pieces of information coincide with each other.

Subject verification apparatus 3 acquires from photographic devices 4 the tracking history information contained in tracking information 500 excluding the subject image information first, and then acquires the subject image information corresponding to the subject selected by subject selector 30.

Subject verification apparatus 3 thus structured operates as follows. Verification unit 40 forms verification information based on subject images, and compares the verification information with the registered verification information so as to verify the subject. When the two pieces of information coincide with each other, notification unit 60 notifies it to the manager of the apparatus by sounding an alarm, providing some other warning, or displaying the verification result on a display device.

This structure allows subject verification apparatus 3 to select a subject to be verified from the tracking history information received from photographic devices 4, and to acquire only the subject image information corresponding to the selected subject from photographic devices 4. This prevents an increase in the amount of data to be acquired from photographic devices 4 with increasing number of subjects. The prevention of an increase in the amount of data to be acquired from photographic devices 4 allows subject verification apparatus 3 to verify a larger number of subjects when subject information is acquired over network 600 from photographic devices 4 installed inside buildings, facilities, and premises or on the street.

Network 600 can be a local area network (LAN) for connecting local regions, or a wide area network using a telephone network or a communication network. When installed close to each other, subject verification apparatus 3 and photographic devices 4 may be directly cable-connected.

The subject detection processing function, subject selection processing function, tracking processing function, verification processing function, and other functions in the present embodiment may be implemented by hardware using an integrated circuit or by software using a central processing unit (CPU), a digital signal processor (DSP), or the like.

INDUSTRIAL APPLICABILITY

The apparatus and method for verifying subjects of the present invention is useful because of its capability of verifying a large number of photographed moving subjects at low cost.

The invention claimed is:
1. A subject verification apparatus comprising:
a camera for continuously photographing a plurality of subjects;
a subject detector for detecting subject images of each of the subjects from a plurality of pieces of image information photographed by the camera;
a subject tracker for tracking each of the subjects in a plurality of time intervals based on movement of the subject images corresponding to each of the subjects, thereby forming tracking information of each of the subjects;
a tracking information storage for storing the tracking information of each of the subjects;
a subject selector for selecting, in one of said time intervals, a subject to have identity verified, from the plurality of subjects, based on the tracking information stored in the tracking information storage, and for avoiding trying to have identity verified of another subject of said plurality of subjects in said one of said time intervals; and a verifier for verifying the identity of the subject selected by the subject selector based on visual identification of the subject.

2. The subject verification apparatus of claim 1, wherein the subject tracker records information obtained by tracking the subjects in the tracking information in chronological order.

3. The subject verification apparatus of claim 2, wherein the verifier records a presence or absence of verification of each of the subjects in the tracking information.

4. The subject verification apparatus of claim 3, wherein the subject selector preferentially selects from the plurality of subjects one of the subjects to be verified that has been verified the least number of times.

5. The subject verification apparatus of claim 3, wherein the subject selector preferentially selects from the plurality of subjects one of the subjects to be verified that remains to be verified.

6. The subject verification apparatus of claim 3, wherein when there are no subjects that remain to be verified in the plurality of subjects, the subject selector preferentially selects one of the subjects to be verified that has not undergone a verification process for the longest period since a prior verification.

7. The subject verification apparatus of claim 2, wherein the subject selector selects the subject images of a same one of the subjects in descending order of size of regions of the subject images.

8. The subject verification apparatus of claim 2, wherein when the subject is a human face, the subject selector selects the subject images of a same one of the subjects in order of being closer to a full-face view.

9. The subject verification apparatus of claim 1 further comprising:
an input unit for providing the subject selector and the verification unit with an input to change selection conditions for selecting the subject.

10. A subject verification apparatus connected to a photographic device for continuously photographing a plurality of subjects and maintaining tracking history information and subject image information of each of the subjects based on movement of subject images of each of the photographed subjects in a plurality of time intervals, the subject verification apparatus comprising:
a receiver for receiving the tracking history information from the photographic device;
received information storage for storing the tracking history information;
a subject selector for selecting, in one of said time intervals, a subject to have identity verified from the plurality of subjects based on the tracking history information stored in the received information storage and for avoiding trying to have identity verified of another subject of said plurality of subjects in said one of said time intervals;
an image transmission controller for acquiring the subject images corresponding to the selected subject from the photographic device; and
a verifier for verifying the identity of the subject images acquired by the image transmission controller based on visual identification of the subject.

11. A subject verification method for verifying subjects by using a subject verification apparatus including a photographing unit for photographing subjects and a tracking information storage for storing tracking information obtained by tracking the subjects, the subject verification method comprising:
a photographing step for continuously photographing a plurality of subjects with the photographing unit;
a subject detection step for detecting subject images of each of the subjects in a plurality of time intervals from a plurality of pieces of image information photographed by the photographing unit;
a subject tracking step for tracking each of the subjects based on movement of the subject images corresponding to each of the subjects;
a tracking information forming step for forming the tracking information of each of the subjects;
a storing step for storing the tracking information of each of the subjects in the tracking information storage;
a subject selection step for selecting, in one of said time intervals, a subject to have identity verified from the plurality of subjects based on the tracking information stored in the tracking information storage and for avoiding trying to have identity verified of another subject of said plurality of subjects in said one of said time intervals; and
a verification step for verifying the identity of the subject selected in the subject selection step based on visual identification of the subject.

12. The subject verifying method of claim 11, wherein in the storing step, information of the subjects is recorded in the tracking information in chronological order.

13. The subject verifying method of claim 12 further comprising:
an updating step for updating the tracking information, in the updating step, the tracking information is updated by assigning history information of the subject verified in the verification step, and for recording a presence or absence of verification of each of the subjects in the tracking information.

14. The subject verifying method of claim 13, wherein the subject selection step preferentially selects from the plurality of subjects one of the subjects to be verified that has been verified the least number of times.

15. The subject verifying method of claim 13, wherein the subject selection step preferentially selects from the plurality of subjects one of the subjects to be verified that remains to be verified.

16. The subject verifying method of claim 13, wherein when there are no subjects that remain to be verified in the plurality of subjects, the subject selection step preferentially selects one of the subjects to be verified that has not undergone a verification process for the longest period since a prior verification.

17. The subject verifying method of claim 12, wherein the subject selection step selects the subject images of a same one of the subjects in descending order of size of regions of the subject images.

18. The subject verifying method of claim 12, wherein when the subject is a human face, the subject selection step selects the subject images of a same one of the subjects in order of being closer to a full-face view.

* * * * *